United States Patent
Almog et al.

(10) Patent No.: US 7,802,076 B2
(45) Date of Patent: Sep. 21, 2010

(54) METHOD AND APPARATUS TO VECTORIZE MULTIPLE INPUT INSTRUCTIONS

(75) Inventors: Yoav Almog, Haifa (IL); Roni Rosner, Binyamina (IL); Ronny Ronen, Haifa (IL)

(73) Assignee: Intel Corporation, Santa Clara, CA (US)

(*) Notice: Subject to any disclaimer, the term of this patent is extended or adjusted under 35 U.S.C. 154(b) by 6 days.

(21) Appl. No.: 10/874,744

(22) Filed: Jun. 24, 2004

(65) Prior Publication Data

US 2005/0289529 A1  Dec. 29, 2005

(51) Int. Cl.
*G06F 9/30* (2006.01)
(52) U.S. Cl. ..................................... 712/205
(58) Field of Classification Search ............... 712/205
See application file for complete search history.

(56) References Cited

U.S. PATENT DOCUMENTS

| | | | |
|---|---|---|---|
| 4,792,894 A | 12/1988 | Artz et al. | |
| 5,956,503 A * | 9/1999 | Arimilli et al. | 712/225 |
| 2003/0023960 A1 * | 1/2003 | Khan et al. | 717/152 |

FOREIGN PATENT DOCUMENTS

| JP | 2000-222209 | 11/1998 |
|---|---|---|
| JP | 2003-202991 | 1/2002 |

OTHER PUBLICATIONS

Cytron R et al., "Efficiently Computing Static Single Assignment Form and the Control Dependence Graph", Mar. 7, 1991, ACM Trans. on Programming Languages and Systems 13(4), pp. 451-490.*
Bulic P. et al., "Fast dependence analysis in a multimedia vectorizing compiler", Feb. 11, 2004, 12th Euromicro Conference on Feb. 11-13, 2004, pp. 176-183.*
U.S. Appl. No. 10/441,479, filed May 20, 2003, Shaeffer.
Bik, et al., "Efficient Exploitation of Parallelism on Pentium III and Pentium 4 Processor-Based Systems", Intel Technology Journal Q1, 2001.
Bulic, P. et al., "Fast Dependence Analysis in a Multimedia Vectorizing Compiler", Parallel, Distributed and Network-Based Processing, 2004, Proceedings, 12th Euromicro Conference on Feb. 11-13, 2004, Piscataway, NJ, USA, IEEE, pp. 176-183.

(Continued)

*Primary Examiner*—Eddie P Chan
*Assistant Examiner*—John Lindlof
(74) *Attorney, Agent, or Firm*—Trop, Pruner & Hu, P.C.

(57) ABSTRACT

An optimization unit to search for two or more candidate instructions in an instruction trace and to merge the two or more candidate instructions into a single instruction with multiple data (SIMD) according to a depth of a trace dependency and a common operation code of the two or more candidate instructions.

17 Claims, 4 Drawing Sheets

*500*

| Level | Original Trace | Level | Trace After Basic Transformations | Trace After Vactorization |
|---|---|---|---|---|
| 1 | ESI ← *ADD* ESI, 4 | 1 | ESI_1 ← *ADD* ESI, 4 | ESI_1 ← *ADD* ESI, 4 |
| 2 | EAX ← *LOAD*(ESI, 0) | 1 | EAX_1 ← *LOAD*(ESI+4, 0) | EAX, EAX_1 ← *SIMD_LOAD*(ESI+4, 0) |
| 3 | CMP EAX, 1 | 2 | *ASSERT* EAX_1 <> 1 | *SIMD_ASSERT*(EAX <> 1, EAX_1 <> 1) |
| 4 | JE | 2 | ESI ← *ADD* ESI_1, 4 | ESI ← *ADD* ESI_1, 4 |
| 2 | ESI ← *ADD* ESI, 4 | 1 | EAX ← *LOAD*(ESI+8, 0) | |
| 3 | EAX ← *LOAD*(ESI, 0) | 2 | *ASSERT* EAX <> 1 | |
| 4 | CMP EAX, 1 | | | |
| 5 | JE | | | |

OTHER PUBLICATIONS

Pajuelo, A. et al., "Speculative Dynamic Vectorization", Proceedings of the 29th International Symposium on Computer Architecture, ISCA2002, May 25-29, 2002, IEEE, pp. 271-280.

International Search Report for PCT/US2005/018444, mailed on Oct. 28, 2005.

UK Intellectual Property Office, Examination Report Dated Sep. 15, 2008, pp. 1-3.

English language translation of an Office Action dated Mar. 7, 2008, issued by The Patent Office of the State Intellectual Property Office of the People's Republic of China, pp. 1-5.

Patricio Bulié, et al., "Fast Dependence Analysis in a Multimedia Vectorizing Compiler," 2004, pp. 1-8.

Japanese Patent Office, Office Action Dated Sep. 16, 2008 in related foreign application, with English language translation.

The Patent Office of the State Intellectual Property Office of the People's Republic of China, Second Office Action dated Mar. 27, 2009, in a related application.

The Patent Office of the State Intellectual Property Office of the People's Republic of China, Third Office Action dated Sep. 11, 2009, in a related application.

Japanese Patent Office, Final Notice of Reason(s) For Refusal dated Jan. 5, 2010 in Japanese patent application No. 2007-518079.

The Patent Office of the State Intellectual Property Office of the People's Republic of China, Fourth Office Action dated Jan. 8, 2010 in Chinese patent application No. 200580021279.0.

The State Intellectual Property Office Of The People's Republic Of China, Notice of the Fifth Office Action dated May 21, 2010, in Chinese patent application No. 200580021279.0.

* cited by examiner

| Height | Original Trace | Trace After Vactorization |
|---|---|---|
| 1 | *MOV* ESP, EBP | *MOV* ESP ← EBP |
| 2 | EAX ← *LOAD*(ESP, 4) | EAX, EBX ← *SIMD_LOAD*(ESP, 4) |
| 2 | EBX ← *LOAD*(ESP, 8) | *CMP* EAX, EBX |
| 3 | *CMP* EAX,EBX | |

*FIG. 4*

| Level | Original Trace | Level | Trace After Basic Transformations | Trace After Vactorization |
|---|---|---|---|---|
| 1 | ESI ← *ADD* ESI, 4 | 1 | ESI_1 ← *ADD* ESI, 4 | ESI_1 ← *ADD* ESI, 4 |
| 2 | EAX ← *LOAD*(ESI, 0) | 1 | EAX_1 ← *LOAD*(ESI+4, 0) | EAX ,EAX_1← *SIMD_LOAD*(ESI+4, 0) |
| 3 | CMP EAX, 1 | 2 | *ASSERT* EAX_1 <> 1 | *SIMD_ASSERT*(EAX <> 1, EAX_1 <> 1) |
| 4 | JE | 2 | ESI ← *ADD* ESI_1, 4 | ESI ← *ADD* ESI_1, 4 |
| 2 | ESI ← *ADD* ESI, 4 | 1 | EAX ← *LOAD*(ESI+8, 0) | |
| 3 | EAX ← *LOAD*(ESI, 0) | 2 | *ASSERT* EAX <> 1 | |
| 4 | CMP EAX, 1 | | | |
| 5 | JE | | | |

*FIG. 5*

METHOD AND APPARATUS TO VECTORIZE MULTIPLE INPUT INSTRUCTIONS

BACKGROUND OF THE INVENTION

A central processing unit (CPU) of a computer system may include multiple functional execution units for processing instructions in parallel. The instructions may include single instruction multiple data (SIMs) instructions. SIMD instruction may execute a common operation on multiple data in parallel. Thus, SIMD instruction may allow the CPU to perform simultaneously a plurality of iterative calculations to reduce the overall execution time. The use of SIMD operations may be exceptionally productive in multi-media applications, such as audio and image processing.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

FIG. 4 is an illustration of a table, helpful with the description of a vectorization operation according to exemplary embodiment of the invention; and FIG. 5 is an illustration of a table, helpful with the description of a vectorization operation according to another exemplary embodiment of the invention.

Figure 1:
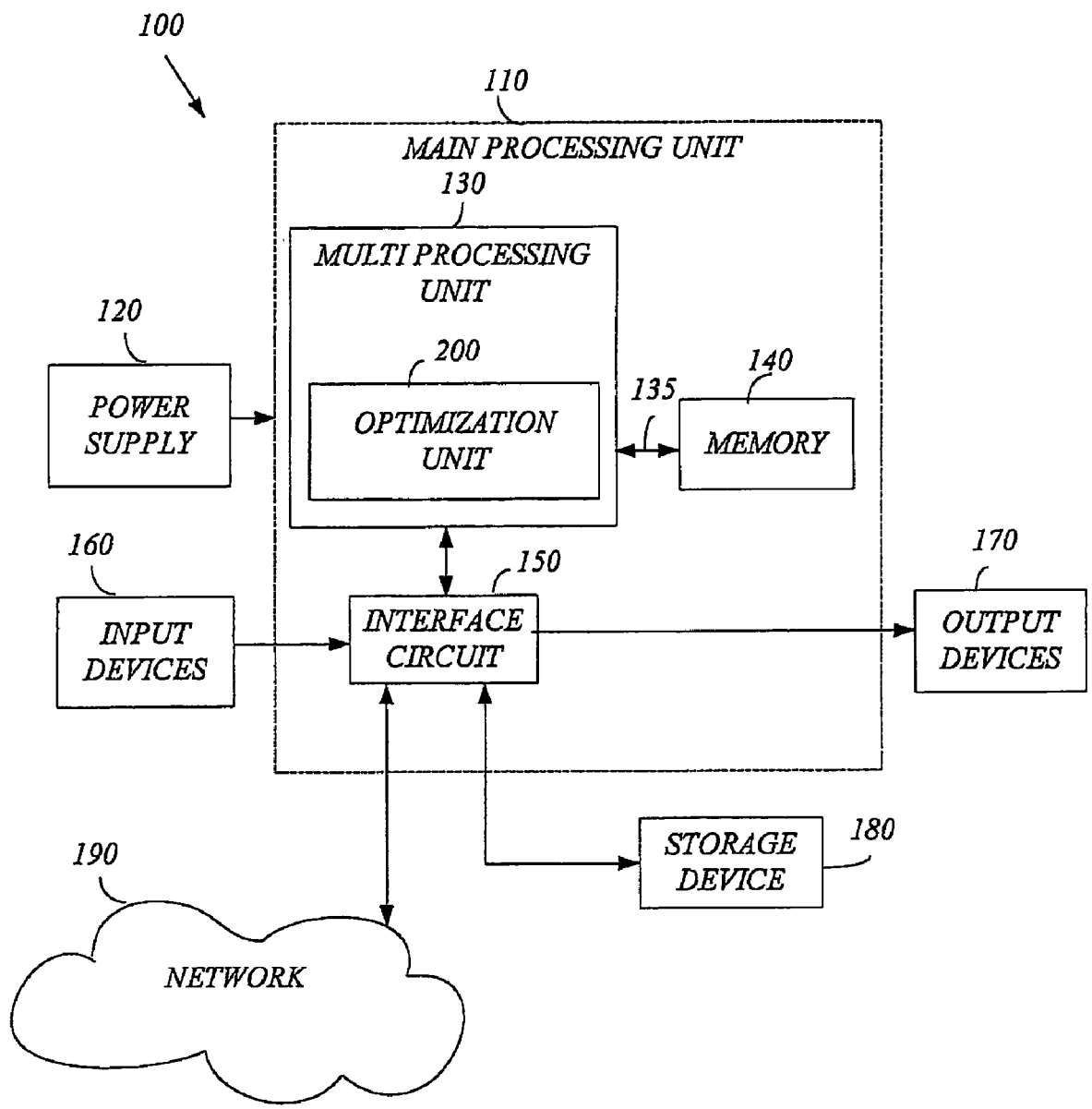
FIG. 1 is a block diagram of computer system according to an exemplary embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Some portions of the detailed description, which follow, are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Unless specifically stated otherwise, as apparent from the following discussions, it is appreciated that throughout the specification discussions utilizing terms such as "processing," "computing," "calculating" "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like. For example, "plurality of instructions" describes two or more instructions.

It should be understood that the terms SIMDification or vectorization are equivalent terms that may refer to the process of merging operations that may be scheduled together for execution and require similar execution resources such as, for example, registers and functional units into a single SIMD instruction. Although the scope of the present invention is not limited in this respect, for the simplicity and clarity of the description the term vectorization will be used to describe the process of merging operations that may be scheduled together for execution and required similar execution resources.

It should be understood that the present invention may be used in a variety of applications. Although the present invention is not limited in this respect, the circuits and techniques disclosed herein may be used in many apparatuses such as computer systems, processors, CPU or the like. Processors intended to be included within the scope of the present invention include, by way of example only, a reduced instruction set computer (RISC), a processor that has a pipeline, a complex instruction set computer (CISC) and the like.

Some embodiments of the invention may be implemented, for example, using a machine-readable medium or article which may store an instruction or a set of instructions that, if executed by a machine (for example, by a processor and/or by other suitable machines), cause the machine to perform a method and/or operations in accordance with embodiments of the invention. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

Turning to FIG. 1, a block diagram of a computer system 100 according to an exemplary embodiment of the invention is shown. Although the scope of the present invention is not limited in this respect, computer system 100 may be a personal computer (PC), a personal digital assistant (DA), an Internet appliance, a cellular telephone, or any other computing device. In one example, computer system 100 may include a main processing unit 110 powered by a power supply 120. In embodiments of the invention, main processing unit 110 may include a multi-processing unit 130 electrically coupled by a system interconnect 135 to a memory device 140 and one or more interface circuits 150. For example, the system interconnect 135 may be an address/data bus, if desired. It should be understood that interconnects other than busses may be used to connect multi-processing unit 130 to memory device 140. For example, one or more dedicated lines and/or a crossbar may be used to connect multi-processing unit 130 to memory device 140.

According to some embodiments of the invention, multi-processing 130 may include any type of processing unit, such as, for example a processor from the Intel® Pentium™ family of microprocessors, the Intel® Itanium™ family of microprocessors, and/or the Intel® XScale™ family of processors. In addition, multi-processing 130 may include any type cache memory, such as, for example, static random access memory (SRAM) and the like. Memory device 140 may include a dynamic random access memory (DRAM), non-volatile memory, or the like. In one example, memory device 140 may store a software program which may be executed by multi-processing 130, if desired.

Although the scope of the present invention is not limited in this respect, interface circuit(s) 110 may include an Ethernet interface and/or a Universal Serial Bus (USB) interface, and/or the like. In some exemplary embodiments of the invention, one or more input devices 160 may be connected to interface circuits 150 for entering data and commands into the main processing unit 110. For example, input devices 160 may include a keyboard, mouse, touch screen, track pad, track ball, isopoint, a voice recognition system, and/or the like.

Although the scope of the present invention is not limited in this respect, the output devices 170 may be operably coupled to main processing unit 110 via one or more of the interface circuits 160 and may include one or more displays, printers, speakers, and/or other output devices, if desired. For example, one of the output devices may be a display. The display may be a cathode ray tube (CRTs), liquid crystal displays (LCDs), or any other type of display.

Although the scope of the present invention is not limited in this respect, computer system 100 may include one or more storage devices 180. For example, computer system 100 may include one or more hard drives, one or more compact disk (CD) drives, one or more digital versatile disk drives (DVD), and/or other computer media input/output (I/O) devices, if desired.

Although the scope of the present invention is not limited in this respect, computer system 100 may exchange data with other devices via a connection to a network 190. The network connection may be any type of network connection, such as an Ethernet connection, digital subscriber line (DSL), telephone line, coaxial cable, etc. Network 190 may be any type of network, such as the Internet, a telephone network, a cable network, a wireless network and/or the like.

Although the scope of the present invention is not limited to this embodiment, in this exemplary embodiment of the invention, multi-processing unit 130 may include an optimization unit 200. According to embodiments of the invention, optimization unit 200 may perform the process of searching for two or more candidate instructions in a trace. Furthermore, optimization unit 200 may merge the two or more candidate instructions into a SIMD instruction according to a depth of a trace dependency tree. In some embodiments of the invention, the candidate instructions may include a similar and/or the same type of operation code that may be included in the SIMD instruction. For example, optimization unit 200 may search for candidate instructions that perform similar operations based on the depth of dependency of the candidate instructions. According to embodiments of the invention, optimization unit 200 may merge at least some of the candidate instructions into a SIMD instruction, if desired. Although the scope of the present invention is not limited in this respect, it should be understood that optimization unit 200 may be implemented in software, in hardware, or in any suitable combination of software and hardware.

Figure 2:
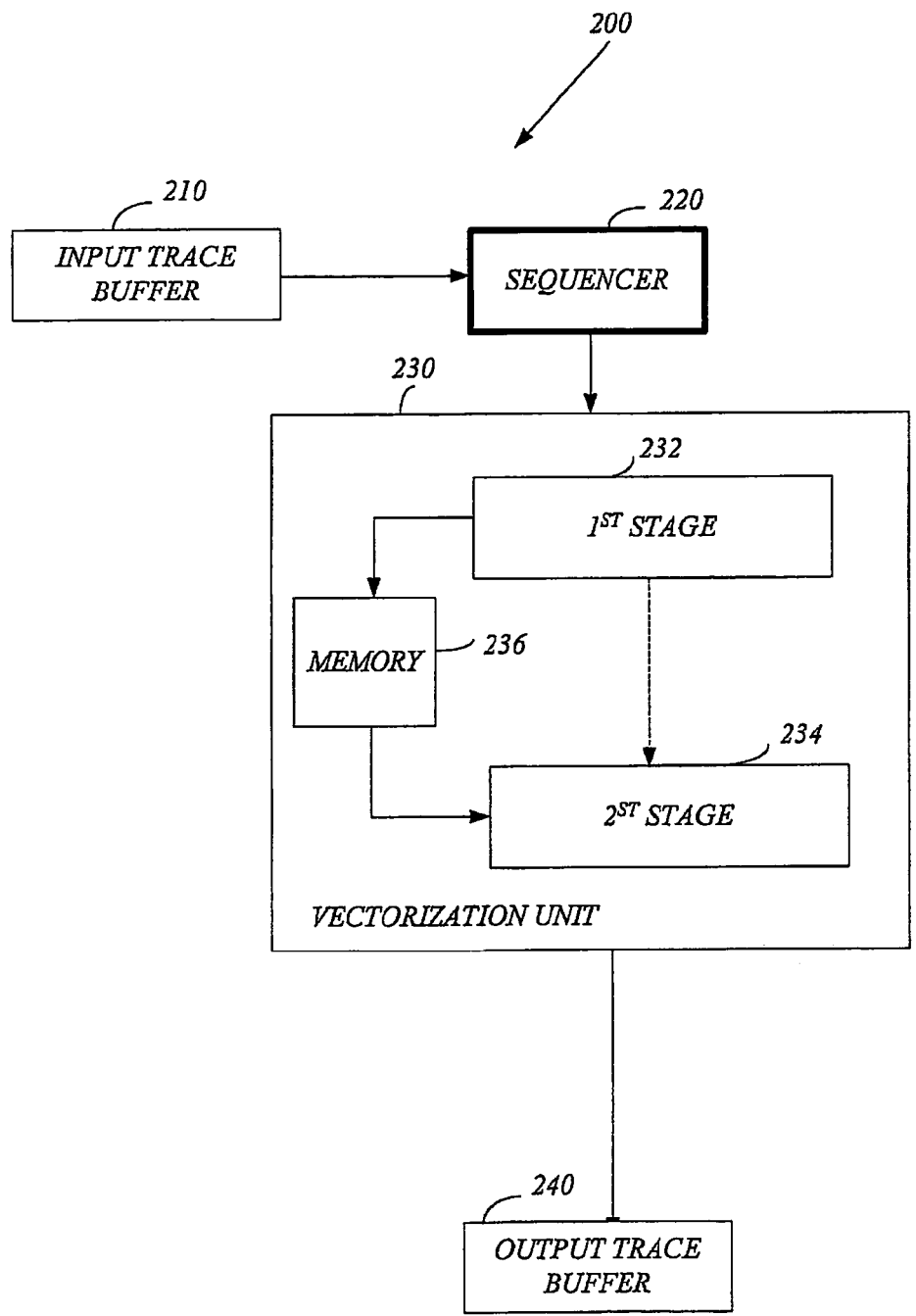
FIG. 2 is a block diagram of an optimizer unit according to an exemplary embodiment of the present invention.

Turning to FIG. 2 a block diagram of optimization unit 200 of FIG. 1, according to an exemplary embodiment of the invention is shown. Although the scope of the present invention is not limited in this respect, optimization unit 200 may include an input trace buffer 210, a sequencer 220, a vectorization unit 230 and an output trace buffer 240. Although the scope of the present invention is not limited in this respect, in some exemplary embodiments of the present invention, vectorization unit 230 may include a first ($1^{st}$) stage 232, a second ($2^{nd}$) stage 234 and a memory 236, for example, a cache memory.

Although the scope of the present invention is not limited in this respect, input trace buffer 210 may receive a trace of instructions which may include operation (op) codes. In some embodiments of the invention, sequencer 220 may pull from input trace buffer 210 instructions, and may provide a trace (e.g. a sequence) of operations codes and/or instructions to vectorization unit 230. For example, an instruction may include at least two types of operations, memory operations such as, for example, LOAD, STORE, etc. and arithmetic operations such as, for example, an operation e.g. ADD, SUBTRACT, MULT, SHIFT, AND, etc. In addition, the instruction may include input values and output values such as, for example, registers and/or constants.

According to an embodiment of the invention, vectorization unit 230 may receive the trace from sequencer 220 and may search for candidate instructions according to trace dependencies. In some embodiments of the invention, $1^{st}$ stage 232 may process op codes instructions received from sequencer 220. For example, instructions and/or op codes of the trace may be transformed into single static assignment (SSA) form. In SSA form, a register may be written only once in the trace, and a renaming process may introduce a "virtual" register name in order to satisfy the SSA condition. A program code such as, for example, a program code written in a conventional Instruction Set Architecture (ISA), may present two source registers with the same name as identical registers, although the scope of the present invention is not limited in this respect.

Although the scope of the present invention is not limited in this respect, $1^{st}$ stage 232 may search for a candidate for vectorization by placing the instructions in a dependency tree.

Figure 3:
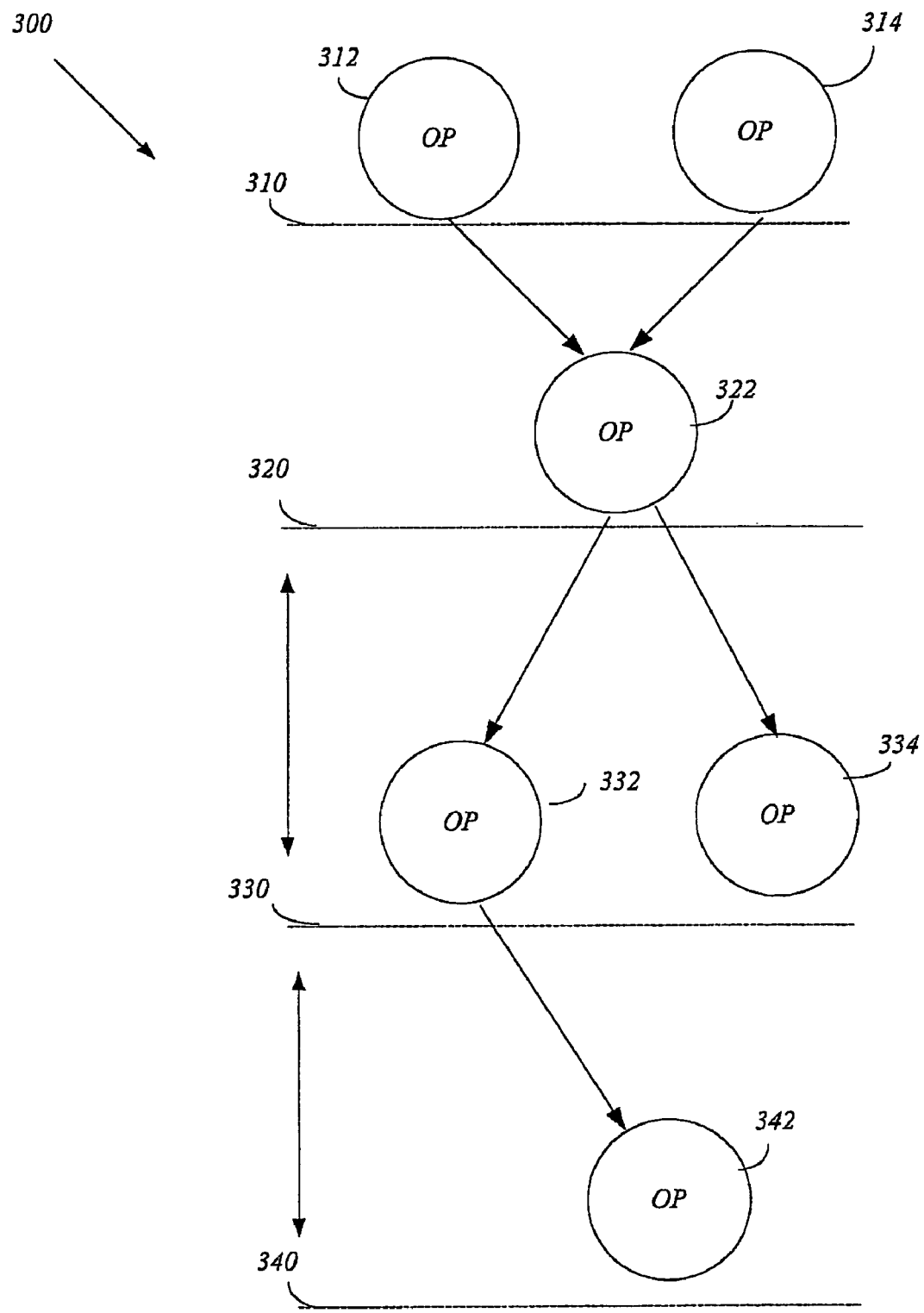
FIG. 3 is an illustration of an exemplary dependency tree helpful to describe a method for transforming instructions into SIMD instruction according to exemplary embodiments of the invention.

Turning to FIG. 3 an illustration of an exemplary dependency tree 300 helpful in describing a method for generating SIMD instructions according to exemplary embodiments of the invention is shown. Although the scope of the present invention is not limited in this respect, dependency tree 300 may include instructions at different heights. A level of the dependency tree 300 may include instructions at the same height. A first level 310 may include instructions 312 and 314, a second level 320 may include an instruction 322, a third level 330 may include instructions 332 and 334 and the fourth level 340 may include an instruction 342, although the scope of the present invention is in no way limited in this respect. In addition, the depth of dependency tree 300 may be calculated according to the distance from first height 310, to the last height 340 of dependency tree 300 (e.g. the distance may shown by the arrows from level to level).

Turning back to FIG. 2, although the scope of the present invention is not limited in this respect, $1^{st}$ stage 232 may store the candidate instructions for vectorization in memory 236. According to embodiments of the invention, $2^{nd}$ stage 234 may search memory 236 for similar op codes having the same or similar level and may generate the SIMD instruction. Furthermore, $2^{nd}$ stage 232 may replace the original trace instructions with SIMD instruction and may store the SIMD instructions in output trace buffer 240.

Although the scope of the present invention is not limited in this respect, the operation of $1^{st}$ stage 232 and $2^{nd}$ stage of optimization unit 200 may be described by an exemplary C-like pseudo code algorithm.

Although the scope of the present invention is not limited in this respect, the first part of the exemplary C-like pseudo code algorithm may define the constants, variables structures and the like.

For example, maximum number of instructions in trace may be defined as:

| const | MAX_TRACE_SIZE |
|---|---|

Maximum number of sources of an instruction may be defined as:

| const | MAX_SOURCES |
|---|---|

Maximum number of sources of destinations of instructions may be defined as:

| const | MAX_DEST |
|---|---|

The trace range and the internal buffer size may be defined as:

| rangedef [0 ... MAX_TRACE_SIZE-1] | inst_index_range |
|---|---|
| inst_index_range | M, N |

According to the exemplary C-like pseudo code algorithm, an instruction structure may include source registers, op code, destination register and a Boolean variable that may indicate if the instruction is suitable for vectorization The instruction structure may be defined as:

```
Structure instruction_type
{
    source_type [MAX_SOURCES]    sources
    destination_type [MAX_DEST]  destinations
    operation_type               operation
    Boolean                      valid
}
```

According to the exemplary C-like pseudo code algorithm, a trace may be defined as a sequence of at most MAX_TRACE_SIZE instructions, represented by a vector of MAX_TRACE_SIZE entries. In addition, two diminutions (2D) trace dependencies bitmap may be use to indicate the validity of an instruction of the trace. If the actual number of instructions in the trace may be INITIAL_TRACE_SIZES then only the first INITIAL_TRACE_SIZE entries may be valid.

| Inst_index_range | INITIAL_TRACE_SIZE |
|---|---|
| Instruction_type | trace [MAX_TRACE_SIZE] |
| Boolean dependent [MAX_TRACE_SIZE,MAX_TRACE_SIZE] | |

According to the exemplary C-like pseudo code algorithm, a SIMD matrix which may be stored in memory 236, may includes the operation codes and may hold N lines of M op codes locations (e.g. total of $N^x M^x \log(MAX\_TRACE\_SIZE)$ bits).

```
Structure entry_type
{
    Boolean            valid
    inst_index_range   loc
}
entry_type             simd_t[N][M]
```

Although the scope of the present invention is not limit in this respect, in this exemplary algorithm, $1^{st}$ stage 232 of optimization unit 230 may search for candidate instructions in the trace by iterating the instructions in the trace in ascending order. $1^{st}$ stage 232 may compare the set of all predecessors of trace that may be constructed during the renaming process. Furthermore, $1^{st}$ stage 232 may tag the height (e.g. level) of the instructions in the dependency tree (e.g. dependency tree 300) by computing the dependency height (e.g. level) of trace, and its earliest potential scheduling location.

```
For i = 0 to INITIAL_TRACE_SIZE -1
    Predecessors = { j | j < i AND dependent [i, j] }
    Height ← 0
    EarliestLocation ← 0
    For Each p in Predecessors
        Height ← max (Height, Height[p]) + 1
        EarliestLocation ← max (EarliestLocation, p)
    End for
    Height[i] ← Height
```

Although the scope of the present invention is not limited in this respect, in this exemplary C-like pseudo code algorithm, $2^{nd}$ stage 234 may search memory 236 (e.g. matrix SIMD) suitable instructions for vectorization. For example, a suitable instruction may be an older instruction trace[j] at the same dependency tree height (e.g. level). In addition, $2^{nd}$ stage 236 may generate SIMD instructions and may replace the original instructions with the SIMD instructions as is shown below:

```
j ← -1
op_type = trace[i].type
For m ← 0 to M-1
    If (simd<op_type>[Height][m].valid == true) &&
       (simd<op_type>[Height][m].loc>EarliestLocation) &&
       (additional constraints are satisfied) then
            j = simd<op_type>[Height][m]
            Break
    End if
End for
```

-continued

```
If(j == -1) then
    Allocate i into simd<op_type>[Height]
Else
    trace[j] ← Vectrozation(trace[j], trace[i])
    trace[i].valid ← false
//  Update dependencies by replacing each reference to trace[i] by
//  a reference to trace[j]
// row-vector operation
    dependent [j][*] ← dependent [i][*] | dependent [j][*]
// column-vector operation
    dependent [*][j] ← dependent [*][i] | dependent [*][j]
    End if
End for
```

According to some embodiments of the invention, optimization unit 200 may generate SIMD instruction according to the rule that two instructions accessing a memory may be combined into a single SIMD instruction if they access continuous memory addresses. That is, it may be calculated from their memory addresses and corresponding data width that the data accessed by the two instructions is adjacent (at least in the virtual memory space). For example, in a trace that includes the following instructions:

1. LOAD 4 bytes from ESP+4
2. LOAD 4 bytes from ESP+12
3. LOAD 4-bytes from ESP+8

The instructions may be combined into a single SIMI instruction

LOAD 12 bytes from ESP+4, if desired.

Turning to FIG. 4. table 400 is shown. Although the scope of the present invention is not limited in this respect, table 400 may include a level column that shows the level of the instructions in the dependency tree (e.g. dependency tree 300), an original trace column that shows the original instructions that may be provided by input trace buffer 210 and sequencer 220 and a trace after vectorization that may show the instructions at output trace buffer 240. The rows of table 400 may show the level of an instruction, the original instruction and the instruction after vectorization.

Although the scope of the present invention is not limited in this respect, optimization unit 200 may tag the depth of the trace dependency graph (e.g. the height of the instructions of the trace). In addition, for example, according to table 400, optimization unit 200 may identify instructions EAX←LOAD(ESP, 4) and EBX←LOAD(ESP, 8) that are in the same level (e.g. level 2) as candidates for vectorization and may combine the candidate instruction into a SIMD instruction EAX, EBX←SIMD_LOAD(ESP, 4), if desired. Although the scope of the present invention is not limited in this respect, optimization unit 200 may generate SIMD instruction by following the roll that two instructions with common operation (e.g. LOAD) and at the same depth of the trace dependency graph (e.g. the height) may be combined into a single SIMD instruction (e.g. SIMD_LOAD) if all their non-constant (i.e. register) sources are similar and/or the constant or immediate sources may differ.

Turning to FIG. 5 a table 500 according to another exemplary embodiment of the invention is shown. Although the scope of the present invention is not limited in this respect, table 500 may include a level column that shows the level of the original instructions in the dependency tree (e.g. dependency tree 300), an original trace column that shows the original instructions that may provided by input trace buffer 210 and sequencer 220, a level column that shows the level of the instructions after a basic transformation, for example SSA, a column that shows the instructions after transformation, and a column that shows the instructions in a trace after vectorization at output trace buffer 240. The rows of table 500 may show the level of an instruction, the original instruction level of the instruction after basic transformation, the instruction after the basic transformation and the instruction after vectorization.

Although the scope of the present invention is not limited in this respect, according to exemplary table 500, optimization unit 200 may tag the height of the original instructions in the trace. Optimization unit 200 may transform the instructions of the trace, for example, into SSA form. Optimization unit 200 may transform the instructions of the trace by using, for example, the trace may be transformed into SSA form. Optimization unit 200 may tag the transformed instructions with the same level as candidate instructions for vectorization, for example, EAX_1 LOAD(ESI+4, 0), EAX LOAD(ESI+8, 0) and ASSERT EAX _1<>1, ASSERT EAX<>1 and may combine them into the SIMD instructions EAX, EAX_1 SIMD_LOAD(ESI+4, 0) and SIMD_ASSERT(EAX_<>1, EAX<>1), respectively.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus comprising:
a first logic to receive instructions of a trace, the instructions having a first height in a trace dependency tree, transform the instructions into a different form and having a second height after the transformation, and combine two or more of the transformed trace instructions having the same operation code into a single instruction multiple data (SIMD) instruction if the two or more instructions have a common height in the trace dependency tree having a plurality of levels and which is stored in a memory.

2. The apparatus of claim 1, wherein the operation code is selected from a group consisting of memory operation codes and arithmetic operation codes.

3. The apparatus of claim 1, wherein the first logic is to search for two or more candidate instructions according to a depth of the trace dependency tree and the operation code;
to store the candidate instructions in a cache memory; and
to combine the two or more candidate instructions into the SIMD instruction.

4. The apparatus of claim 3, wherein the first logic is able to combine the two or more candidate instructions that access continuous memory addresses.

5. The apparatus of claim 1, wherein the different form is a single static assignment form.

6. A method comprising:
receiving instructions of a trace, the instructions having a first height in a trace dependency tree having a plurality of levels and which is stored in a memory;
transforming the instructions into a single static assignment form, the transformed instructions having a second height;
combining two or more of the transformed instructions having the same operation code into a single instruction multiple data (SIMD) instruction if the two or more transformed instructions have a common height in the trace dependency tree, the SIMD instruction identifying two source registers by the same name,
wherein the two source registers are either the same or adjacent to each other.

7. The method of claim 6 comprising:
selecting the operation code from a group consisting of memory operation codes and arithmetic operation codes.

8. The method of claim 6 comprising:
combining the two or more candidate instructions that access continuous memory addresses according to a depth of the trace dependency tree and the operation code.

9. A system comprising:
a bus;
a memory device coupled to the bus; and
a processor including an input trace buffer to receive a trace of instructions, a sequencer to pull a sequence of instructions from the input trace buffer, and a first logic to receive the sequence and including a first stage to receive instructions having a first height in a trace dependency tree, transform the instructions into a different form and having a second height after the transformation, and store the transformed instructions in a memory at a selected height of a plurality of levels of the trace dependency tree, a second stage to search the memory for two or more of the transformed instructions of a common height in the trace dependency tree and combine the two or more instructions into a single instruction multiple data (SIMD) instruction if the two or more instructions have the common height in the trace dependency tree, and to store the SIMD instruction in an output trace buffer coupled to the first logic.

10. The system of claim 9, wherein the combined two or more instructions have an operation code selected from a group consisting of memory operation codes and arithmetic operation codes.

11. The system of claim 9 wherein the first logic is
to search for two or more candidate instructions according to the depth of the trace dependency tree and a common operation code;
to store the candidate instructions in a cache memory; and
to combine the two or more candidate instructions into the SIMD instruction.

12. The system of claim 11, wherein the first logic is able to combine the two or more candidate instructions that access continuous memory addresses.

13. The system of claim 9, wherein the different form is a single static assignment form.

14. An article comprising:
a computer readable storage medium, having stored thereon instructions, that when executed, result in:
receiving instructions of a trace, the instructions having an initial height in a trace dependency tree having a plurality of heights;
transforming the instructions into a single static assignment form, the transformed instructions having a transformed height;
combining two or more of the transformed instructions having the same operation code into a single instruction multiple data (SIMD) instruction according to a depth of the trace dependency tree, wherein the depth of the trace dependency tree corresponds to a distance between a first height and a last height of the trace dependency tree; and
outputting the SIMD instruction to an output trace buffer.

15. The article of claim 14, wherein the instructions, when executed, result in:
selecting the operation code from a group consisting of memory operation codes and arithmetic operation codes.

16. The article of claim 14, wherein instructions, when executed, result in:
combining the two or more candidate instructions that access continuous memory addresses according to the depth of the trace dependency tree and the operation code.

17. The apparatus of claim 1, wherein the first logic includes:
a first stage to receive instructions and store the instructions in the memory at a selected height of the plurality of levels of the trace dependency tree; and
a second stage to search the memory for the two or more instructions of the common height.

* * * * *